US009075077B2

(12) United States Patent
Zolfagharkhani et al.

(10) Patent No.: US 9,075,077 B2
(45) Date of Patent: Jul. 7, 2015

(54) RESONANT SENSING USING EXTENSIONAL MODES OF A PLATE

(75) Inventors: Guiti Zolfagharkhani, Brighton, MA (US); Jan H. Kuypers, Cambridge, MA (US); Alexei Gaidarzhy, Cambridge, MA (US)

(73) Assignee: Analog Devices, Inc., Norwood, MA (US)

( * ) Notice: Subject to any disclaimer, the term of this patent is extended or adjusted under 35 U.S.C. 154(b) by 147 days.

(21) Appl. No.: 13/234,352

(22) Filed: Sep. 16, 2011

(65) Prior Publication Data

US 2012/0067124 A1 Mar. 22, 2012

Related U.S. Application Data

(60) Provisional application No. 61/384,621, filed on Sep. 20, 2010.

(51) Int. Cl.
*G01P 15/10* (2006.01)
*G01C 19/56* (2012.01)
*G01P 15/097* (2006.01)
*G01C 19/5733* (2012.01)

(52) U.S. Cl.
CPC .......... *G01P 15/097* (2013.01); *G01C 19/5733* (2013.01)

(58) Field of Classification Search
USPC ............... 73/514.29, 514.34, 514.36, 504.15, 73/504.14
See application file for complete search history.

(56) References Cited

U.S. PATENT DOCUMENTS

| 3,848,144 | A | * | 11/1974 | Schissler ................ 310/313 B |
| 4,278,492 | A | | 7/1981 | Cross |
| 4,306,456 | A | * | 12/1981 | Maerfeld ................. 73/514.28 |
| 4,364,016 | A | | 12/1982 | Tanski |
| 4,395,849 | A | | 8/1983 | Kasai et al. |
| 4,442,574 | A | | 4/1984 | Wanuga |
| 4,454,639 | A | | 6/1984 | Dworsky |
| 4,609,844 | A | * | 9/1986 | Nakamura et al. ............ 310/321 |
| 4,631,197 | A | | 12/1986 | DeFreese |
| 4,655,081 | A | | 4/1987 | Burdess |
| 4,750,364 | A | | 6/1988 | Kawamura et al. |
| 4,891,982 | A | * | 1/1990 | Norling ........................ 73/497 |
| 5,226,321 | A | | 7/1993 | Varnham et al. |

(Continued)

FOREIGN PATENT DOCUMENTS

EP 0375360 6/1990
EP 0706053 4/1996

(Continued)

OTHER PUBLICATIONS

Di Pietrantonio, "Guided Lamb Wave Electroacoustic Devices on Micromachined AlN/Al Plates", IEEE Transactions on Ultrasonics, Ferroelectrics, and Frequency Control. pp. 1175-1182. vol. 57, No. 5, May 2010.

(Continued)

*Primary Examiner* — Helen Kwok
(74) *Attorney, Agent, or Firm* — Cooley LLP

(57) ABSTRACT

A device or system that incorporates teachings of the present disclosure may include, for example, a resonant structure having a plate, a mass and a set of electrodes. The plate can have an extensional mode at a frequency when excited. The set of electrodes can be used to measure an acceleration of the mass when the acceleration of the mass changes the frequency of the plate. Other embodiments are disclosed.

25 Claims, 7 Drawing Sheets

(56) References Cited

U.S. PATENT DOCUMENTS

| | | | |
|---|---|---|---|
| 5,416,447 A | 5/1995 | Andres | |
| 5,501,103 A * | 3/1996 | Woodruff et al. | 73/514.29 |
| 5,677,485 A * | 10/1997 | Nakamura | 73/497 |
| 5,679,896 A * | 10/1997 | Nakamura et al. | 73/514.34 |
| 5,736,640 A | 4/1998 | Farine et al. | |
| 5,824,903 A * | 10/1998 | Nakamura et al. | 73/514.34 |
| 5,889,208 A | 3/1999 | Nose | |
| 5,913,244 A * | 6/1999 | Heinouchi | 73/662 |
| 5,914,553 A | 6/1999 | Adams | |
| 5,939,956 A | 8/1999 | Arimura | |
| 5,969,249 A * | 10/1999 | Roessig et al. | 73/514.15 |
| 6,121,856 A | 9/2000 | Apostolos | |
| 6,124,765 A | 9/2000 | Chan | |
| 6,209,393 B1 | 4/2001 | Tomikawa et al. | |
| 6,307,447 B1 | 10/2001 | Barber et al. | |
| 6,420,820 B1 | 7/2002 | Larson | |
| 6,453,744 B2 * | 9/2002 | Williams | 73/504.12 |
| 6,577,040 B2 | 6/2003 | Nguyen | |
| 6,595,054 B2 * | 7/2003 | Paros et al. | 73/504.04 |
| 6,739,190 B2 | 5/2004 | Hsu | |
| 6,745,627 B1 * | 6/2004 | Woodruff et al. | 73/514.29 |
| 6,828,713 B2 | 12/2004 | Bradley | |
| 6,831,531 B1 | 12/2004 | Giousouf | |
| 6,859,113 B2 | 2/2005 | Giousouf | |
| 6,909,221 B2 | 6/2005 | Ayazi | |
| 6,943,484 B2 | 9/2005 | Clark | |
| 6,954,020 B2 | 10/2005 | Ma | |
| 6,975,184 B2 | 12/2005 | Wang | |
| 6,987,432 B2 | 1/2006 | Lutz | |
| 6,995,622 B2 | 2/2006 | Partridge | |
| 7,005,946 B2 | 2/2006 | Duwel | |
| 7,024,934 B2 * | 4/2006 | Yu | 73/514.37 |
| 7,068,125 B2 | 6/2006 | Lutz | |
| 7,102,467 B2 | 9/2006 | Lutz | |
| 7,138,889 B2 | 11/2006 | Lakin | |
| 7,170,369 B2 | 1/2007 | Huang | |
| 7,211,926 B2 | 5/2007 | Quevy | |
| 7,215,061 B2 | 5/2007 | Kihara | |
| 7,248,128 B2 | 7/2007 | Mattila | |
| 7,310,029 B2 | 12/2007 | Robert | |
| 7,327,070 B2 | 2/2008 | Tanaka | |
| 7,352,608 B2 | 4/2008 | Mohanty | |
| 7,492,241 B2 | 2/2009 | Piazza | |
| 7,504,909 B2 | 3/2009 | Tada | |
| 7,528,685 B2 | 5/2009 | Tanaka | |
| 7,535,152 B2 | 5/2009 | Ogami | |
| 7,561,009 B2 | 7/2009 | Larson | |
| 7,724,103 B2 | 5/2010 | Feng | |
| 7,741,752 B2 | 6/2010 | Shih et al. | |
| 7,791,432 B2 | 9/2010 | Piazza | |
| 7,812,692 B2 | 10/2010 | Ayazi | |
| 7,868,517 B2 | 1/2011 | Belot | |
| 7,950,281 B2 | 5/2011 | Hammerschmidt | |
| 7,954,377 B2 * | 6/2011 | Higuchi et al. | 73/514.34 |
| 7,965,015 B2 | 6/2011 | Tai | |
| 8,058,769 B2 * | 11/2011 | Chen et al. | 310/313 R |
| 8,395,456 B2 | 3/2013 | Badillo et al. | |
| 8,410,868 B2 * | 4/2013 | Schoepf et al. | 333/186 |
| 8,446,078 B2 * | 5/2013 | Bahreyni et al. | 310/368 |
| 8,487,715 B2 | 7/2013 | Mohanty et al. | |
| 2002/0075100 A1 | 6/2002 | Katohno | |
| 2002/0158700 A1 | 10/2002 | Nemoto | |
| 2003/0020565 A1 | 1/2003 | Cornett et al. | |
| 2003/0034852 A1 | 2/2003 | Kobayashi | |
| 2003/0146674 A1 | 8/2003 | Jacob | |
| 2004/0056728 A1 | 3/2004 | Dent | |
| 2004/0239450 A1 | 12/2004 | Wang | |
| 2005/0073078 A1 | 4/2005 | Lutz | |
| 2005/0110598 A1 | 5/2005 | Larson | |
| 2005/0242904 A1 | 11/2005 | Lutz et al. | |
| 2006/0214747 A1 | 9/2006 | Lakin | |
| 2007/0188047 A1 | 8/2007 | Tanaka | |
| 2007/0222336 A1 | 9/2007 | Grannen | |
| 2007/0257750 A1 | 11/2007 | Tilmans et al. | |
| 2008/0028584 A1 | 2/2008 | Barber et al. | |
| 2008/0048804 A1 | 2/2008 | Volatier | |
| 2008/0087083 A1 * | 4/2008 | Nishizawa et al. | 73/514.29 |
| 2008/0143217 A1 | 6/2008 | Ho | |
| 2008/0204153 A1 | 8/2008 | Yoshida | |
| 2008/0272852 A1 | 11/2008 | Six | |
| 2008/0284286 A1 | 11/2008 | Ogawa | |
| 2008/0297281 A1 | 12/2008 | Ayazi | |
| 2009/0026882 A1 | 1/2009 | Steeneken | |
| 2009/0108381 A1 | 4/2009 | Buchwalter | |
| 2009/0108959 A1 | 4/2009 | Piazza | |
| 2009/0144963 A1 | 6/2009 | Piazza | |
| 2009/0243747 A1 | 10/2009 | Gaidarzhy | |
| 2009/0255338 A1 * | 10/2009 | Watanabe | 73/504.16 |
| 2009/0294638 A1 | 12/2009 | Mohanty | |
| 2010/0007443 A1 | 1/2010 | Mohanty | |
| 2010/0026136 A1 | 2/2010 | Gaidarzhy | |
| 2010/0038991 A1 | 2/2010 | Shih | |
| 2010/0134207 A1 | 6/2010 | Mohanty | |
| 2010/0155883 A1 | 6/2010 | Wenzler | |
| 2010/0181868 A1 | 7/2010 | Gaidarzhy | |
| 2010/0182102 A1 | 7/2010 | Kuypers et al. | |
| 2010/0237959 A1 | 9/2010 | Tanaka | |
| 2011/0133856 A1 | 6/2011 | Piazza et al. | |

FOREIGN PATENT DOCUMENTS

| | | |
|---|---|---|
| EP | 0707212 | 4/1996 |
| EP | 0791832 | 8/1997 |
| EP | 1505722 | 2/2005 |
| WO | WO98/01948 | 1/1998 |
| WO | WO98/37635 | 8/1998 |
| WO | WO02/17481 | 2/2002 |
| WO | WO2006/000611 | 1/2006 |
| WO | WO2006/083482 | 8/2006 |
| WO | WO2006/130777 | 12/2006 |
| WO | WO2007/072408 | 6/2007 |
| WO | WO2007/072409 | 6/2007 |
| WO | WO2007/143520 | 12/2007 |
| WO | WO2010/011288 | 1/2010 |

OTHER PUBLICATIONS

Driscoll, M.M, , "Voltage-Controlled Crystal Oscillators", IEEE Transactions on Electron Devices, Aug. 1971, vol. 18 (8), pp. 528-535.

Driscoll, M.M., "Linear Frequency Tuning of SAW Resonators", Trans. Ultrason. Ferroelectr. Freq. Control. IEEE 1991. Westinghouse Electr. Corp., Baltimore, MD, 38(4): 366-9.

Humad, "High Frequency Micromechanical Piezo-On Silicon Block Resonators", Int'l Electron Devices Meeting 2003 IEDM. Technical Digest, Washington, D.C. Dec. 8-10, 2003, New York, NY IEEE US Dec. 8, 2003, pp. 957-960.

Kadota, "High-Frequency Lamb Wave Device Composed of MEMS Structure Using LINBO3 Thin Film and Air Gap", IEEE Transactions on Ultrasonics, Ferroelectrics, and Frequency Control. pp. 2564-2571. vol. 57, No. 11, Nov. 2010.

Onoe, "Several Extensions of Mindlin-Gazis's Analysis of Rotated Y-Cut of Quartz (Invited)", 2008 IEEE. pp. 10-18.

Parker, "Precision Surface-Acoustic-Wave (SAW) Oscillators", IEEE Transactions on Ultrasonics, Ferroelectrics, and Frequency Control. pp. 342-364. vol. 35 No. 3, May 1988.

Patent Cooperation Treaty, "International Preliminary Report on Patentability and Written Opinion", for International Application No. PCT/US06/021298 mailed Nov. 6, 2006 and Dec. 6, 2007 respectively.

Patent Cooperation Treaty, "International Search Report and Written Opinion", for International Application No. PCT/US09/06587 mailed Feb. 26, 2010.

Patent Cooperation Treaty, "International Search Report and Written Opinion", for International Application No. PCT/US09/06590 mailed Mar. 1, 2010.

Patent Cooperation Treaty, "International Search Report and Written Opinion", for International Application No. PCT/US10/000301 mailed Sep. 3, 2010.

Piazza, "Low Motional Resistance Ring-Shaped Contour-Mode Aluminum Nitride Piezoelectric Micromechanical Resonators for UHF

(56) References Cited

OTHER PUBLICATIONS

Applications", Micro Electro Mechanical Systems, 2005. MEMS 2005. 18th IEEE International Conference on Miami Beach, Florida, Jan. 30-Feb. 3, 2005, Piscataway, NJ, US, IEEE Jan. 30, 2005, pp. 20-30.

Reinhardt, "Simulation FO BAW Resonators Frequency Adjustment", 2007 Ultrasonics Symposium. pp. 1444-1447.

Tirole, "Lamb Waves Pressure Sensor Using an AζN/SI Structure", 1993 Ultrasonics Symposium. pp. 371-374.

Uno, "Frequency Trimming of SAW Devices", IEEE, Ultrasonics Symposium, 1994. pp. 181-187.

Wang, "In-Situ Frequency Trimming of SAW Resonator Using Conventional Crystal Resonator Fine Tuning Method With Gold Thin Film Addition", 2003 IEEE Ultrasonics Symposium. pp. 1730-1733.

Wang, "Method of Fabricating Multiple-Frequency Film Bulk Acoustic Resonators in a Single Chip", 2006 IEEE. pp. 793-796.

Wang, "The Analysis of the Third-Order Thickness-Shear Overtone Vibrations of Quartz Cristal Plates With Mindlin Plate Theory", 2008 IEEE International Ultrasonics Symposium Proceedings. pp. 2173-2176.

Wingqvist, "A Micromachined Thermally Compensated Thin Film Lamb Wave Resonator for Frequecy Control and Sensing Applications", IOP Publishing Ltd., Journal of Micromechanics and Microengineering 19 (2009) 035018. pp. 1-9.

Yatsuda, "Flip-Chip STW Filters and Frequency Trimming Method", 2002 IEEE International Frequency Control Symposium and PDA Exhibition. pp. 366-369.

\* cited by examiner

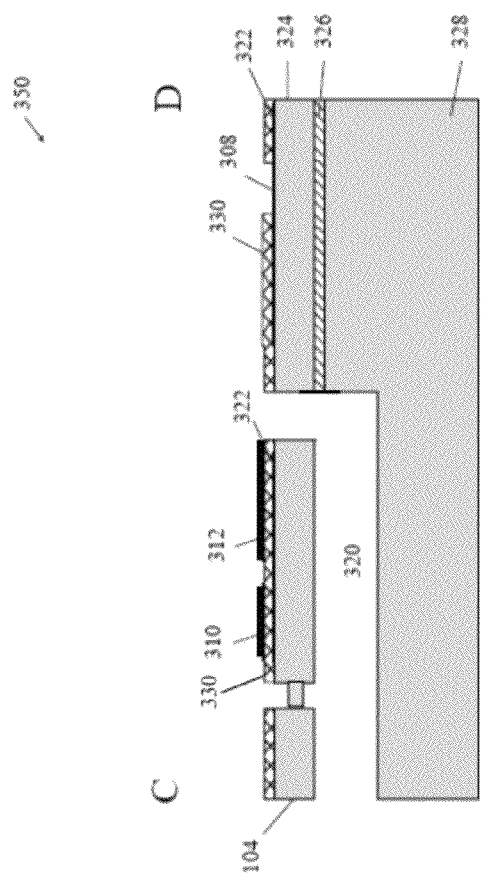
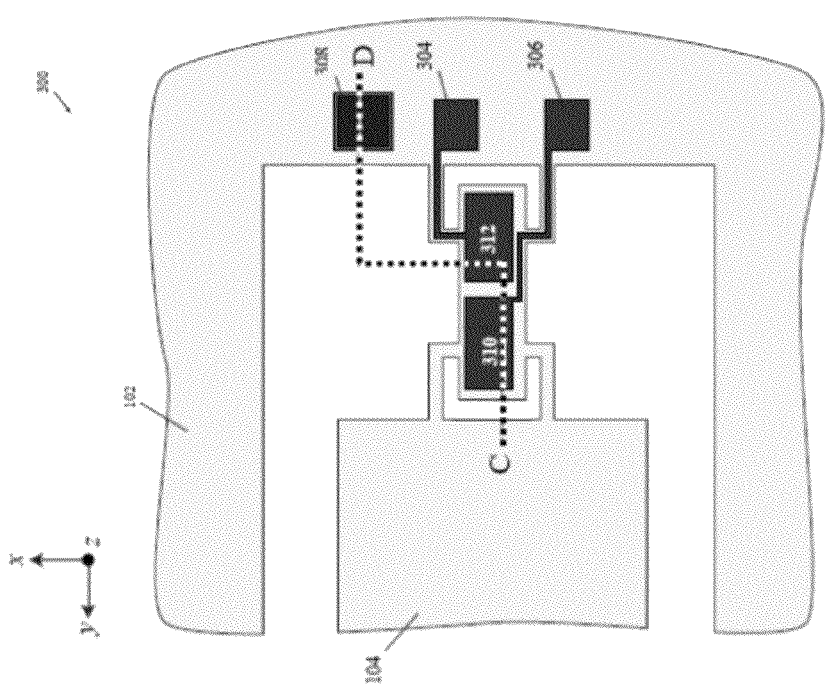
Fig. 4b
Fig. 4a ure, according to an embodiment. As shown in FIG. 1, the resonant structure 10 includes a mass 12, a plate 14, a substrate 16 and a set of electrodes 18 and 19. In this example, electrodes 18 are located at and mechanically connected to plate 14; electrode 19 is located at substrate 16. The mass 12 and plate 14 are connected or attached together. The plate 14 and substrate 16 are connected or attached together.

US 9,075,077 B2

RESONANT SENSING USING EXTENSIONAL MODES OF A PLATE

PRIOR APPLICATION

The present application claims the benefit of priority to U.S. Provisional Application No. 61/384,621 filed on Sep. 20, 2010, which is hereby incorporated herein by reference.

RELATED APPLICATION(S)

U.S. patent application, Ser. No. 13/186,428, filed Jul. 19, 2011, by Florian Thalmayr et al., entitled "METHOD AND APPARATUS FOR MANUFACTURING A RESONATING STRUCTURE." All sections of the aforementioned application(s) are incorporated herein by reference.

BACKGROUND

The mechanical resonating structures can be incorporated into a variety of devices. A mechanical resonating structure can be integrated, for example, in tunable meters, mass sensors, gyros, accelerometers, switches, and electromagnetic fuel sensors. Mechanical resonating structures can also be integrated in a timing oscillator. Timing oscillators can precisely generate clock signals, for example, as a reference frequency to help synchronize other signals that are received, processed, or transmitted by a device in which the timing oscillator is integrated. Mechanical resonating structures can also be in circuitry such as filters, mixers, dividers, amplifiers or other application specific components.

Mechanical resonators can be used in several devices including digital clocks, radios, computers, oscilloscopes, signal generators, cell phones, or other forms of portable communication devices.

BRIEF DESCRIPTION OF THE DRAWINGS

FIGS. 4a and 4b show a top view and a cross-sectional view along the line C-D, respectively, of the resonant structure of FIGS. 2a, 2b, 3a and 3b and including a piezoelectric thin film to excite the second order extensional mode shown in FIGS. 3a and 3b.

DETAILED DESCRIPTION

In one embodiment, an acceleration signal can be detected as a change in the resonance frequency of a resonant structure. This detection of the acceleration signal can be used, for example, in accelerometers for sensing the acceleration, in gyroscopes for sensing the rotation rate, in force sensors and/or in mass sensors.

One embodiment of the present disclosure includes an apparatus can include a resonant structure having a plate, a mass and a set of electrodes. The plate can have an extensional mode at a frequency when excited. The set of electrodes can measure an acceleration of the mass when the acceleration of the mass changes the frequency.

One embodiment of the present disclosure includes an apparatus can include a resonant structure having a plate, a mass and a plurality of electrodes. The plate can have an extensional mode at a frequency when excited, while the plurality of electrodes can measure an acceleration of the mass when the acceleration of the mass changes the frequency.

One embodiment of the present disclosure includes an apparatus can include a resonant structure having a plate and a mass attached to the plate. The plate can have an extensional mode at a first frequency when excited along an axis. The plate can also have a second frequency when the mass is moved along the axis by an external force, a difference between the first frequency and the second frequency being associated with an acceleration of the mass when moved.

One embodiment of the present disclosure includes a method for exciting a plate of a resonant structure at an extensional mode having a frequency, and measuring an acceleration of a mass of the resonant structure when the acceleration of the mass changes the frequency of the plate.

Figure 1:
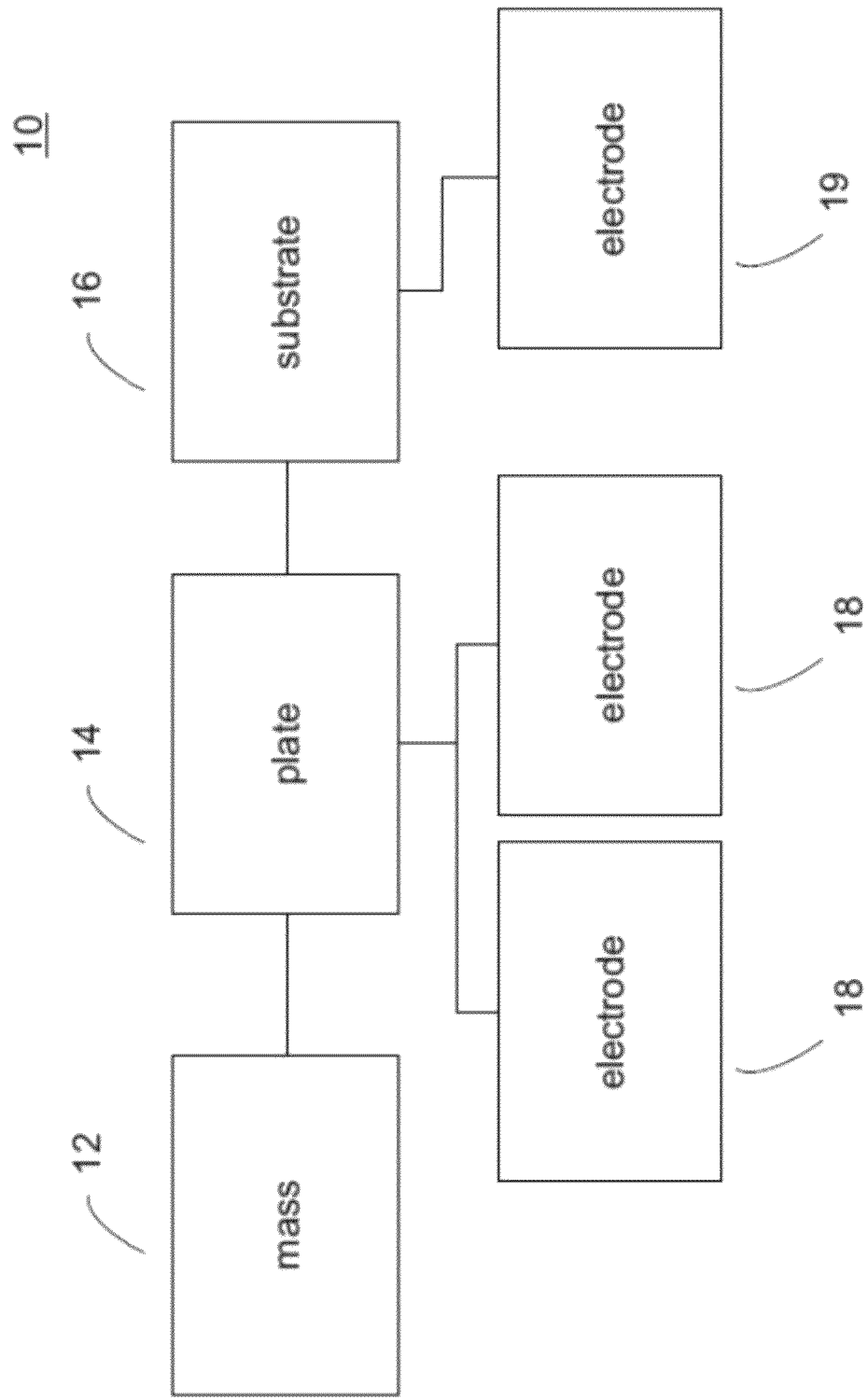
FIG. 1 shows a system block diagram of a resonant structure, according to an embodiment.

FIG. 1 shows a system block diagram of a resonant structure, according to an embodiment. As shown in FIG. 1, the resonant structure 10 includes a mass 12, a plate 14, a substrate 16 and a set of electrodes 18 and 19. In this example, electrodes 18 are located at and mechanically connected to plate 14; electrode 19 is located at substrate 16. The mass 12 and plate 14 are connected or attached together. The plate 14 and substrate 16 are connected or attached together.

As FIG. 1 illustrates, the resonant structure can take different forms. For example, although the resonant element is described herein in the form of a plate 14, the resonant structure can have other forms as well. The plate 14 can be driven in its first or higher order extensional modes by electrodes 18 and 19, and the change in the resonance frequency of plate's extensional modes can be measured by electrodes 18 and 19. The change in the resonance frequency of plate's extensional modes is associated with or related to the acceleration of the mass 12. For example, the change in the resonance frequency of plate's extensional modes can be proportional to the acceleration of the mass 12. This acceleration of the mass 12 is proportional to, for example, the rotation rate in gyroscopes, acceleration in accelerometers, forces in force sensors and forces in mass sensors.

Some of the advantages of resonant sensing include reduced susceptibility to feed-through coupling and circuit parasitics, potential immunity to amplitude-modulation (AM) noise and bias drifts, allowing for greater dynamic range, and the general ease of frequency measurement.

As used in this specification, the singular forms "a," "an" and "the" include plural referents unless the context clearly dictates otherwise. Thus, for example, the term "a plate" is intended to mean a single plate or a combination of plates.

Figure 2A:
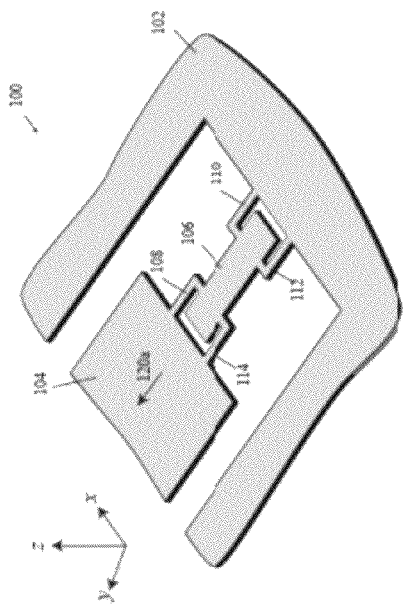
FIGS. 2a and 2b show a top perspective view of a resonant structure during the first half cycle of a vibration and the second half cycle of a vibration of a proof mass, respectively, according to an embodiment.
Figure 2B:
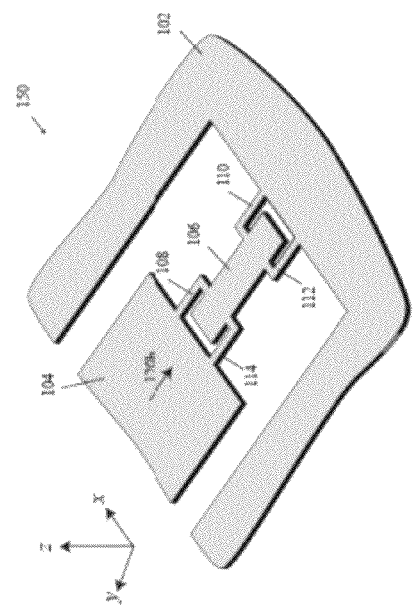

FIG. 2a shows a top perspective view of a resonant structure during the first cycle of a vibration, according to an embodiment. As shown in FIG. 2a, a proof mass 104 is attached to a plate 106. The plate 106 is connected to the proof mass 104 and a substrate 102 through four anchors 108, 110, 112, 114. One possible mechanical vibration of the proof mass 104 indicated by the arrow 120a. The vibration of the proof mass 104 for the other half cycled is illustrated in FIG. 2b by arrow 120b.

Figure 3A:
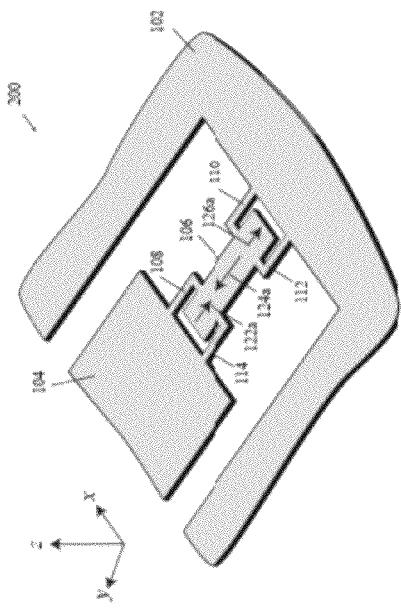
FIGS. 3a and 3b show a top perspective view of the resonant structure of FIGS. 2a and 2b, during the first half of the cycle and the second half of the cycle of a vibration of the second order extensional mode of a plate, respectively.

The motion of the plate 106 in its extensional mode is represented in FIG. 3a. The arrows 122a, 124a and 126a represent the expansion and contraction of the plate 106, resembling the second order extensional mode of the plate during the first half cycle of the plate motion. On the second half cycle of the plate motion, the plate contracts and expands according to the arrows 122b, 124b and 126b.

Figure 3B:
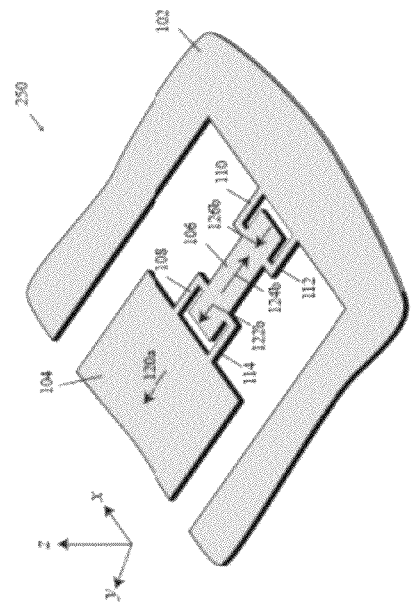

FIG. 4a shows a top view of the resonant structure of FIGS. 2a, 2b, 3a and 3b, and illustrates an example of how second order extensional mode illustrated in FIGS. 3a and 3b can be excited. The cross-section of this device is shown in FIG. 4b taken along line C-D from FIG. 4a. Please note that FIG. 4b is not drawn to the same scale as the top view of FIG. 4a. The proposed structure uses a piezoelectric thin film 330 on top of another layer 324. In one embodiment, a portion of the piezoelectric thin film 330 can be on top of layer 324 and another portion of the piezoelectric thin film 330 can be on top of layer 322, which is a conductive layer. The electrode layers 310 and 312 are located on top of the piezoelectric layer 330 —also shown in FIG. 4a. The bottom electrode 308 is below the piezoelectric layer 330. Although layer 324 is shown as a single layer, alternatively it can be composed of more than one layer such as for example an additional dielectric layer 326. Layer 324 can also include a temperature-compensated stack as described in U.S. Patent Application No. 2010/0182102 entitled "Mechanical Resonating Structures Including a Temperature Compensation Structure," which is incorporated herein by reference. In one aspect, the compensating structure comprises a first layer having a stiffness that increases with increasing temperature over at least a first temperature range, a third layer having a stiffness that increases with increasing temperature over at least the first temperature range, and a second layer between the first layer and the third layer. The temperature-compensated stack may be formed of only a single layer. In one such embodiment, for example, the active layer may be formed of silicon and the single layer of the compensation structure may be formed of $SiO_2$. In an alternative such embodiment, the active layer may be formed of aluminum nitride (AlN) and the single layer of the compensation structure may be formed of silicon dioxide ($SiO_2$). Other choices for the materials may also be used. The first layer can have characteristics that are selected so that it has a positive TCS (i.e., TCS>0) over a temperature range. For example, the composition of the first layer may be selected to provide a positive TCS. Suitable compositions can include $SiO_2$ and $Al_2O_3$, amongst others. In some cases, $SiO_2$ may be preferred. In some cases, the first layer may be composed of a series of ultra-thin layers (e.g., less than 10 nm thick) which are combined to produce an overall layer having a positive TCS. The positive TCS may also, or alternatively, be engineered by implanting species (e.g., ions, neutrons) into the first layer. Thus, it should be understood that a layer exhibiting a positive TCS may be obtained in any of a number of suitable ways, and that the various aspects described herein including one or more layers exhibiting a positive TCS are not limited in the manner in which the positive TCS is obtained. As noted above, the first layer can have a positive TCS over a temperature range. In some cases, the TCS is positive across the entire operating temperature range of the device. For example, the TCS may be positive across the temperature range of between −55 C and 150 C, or between 40 C and 85 C. However, in other cases, the TCS of the first layer may be positive across a portion of the operating range, and negative across other portion(s). The TCS of the first layer may be positive across the majority of the temperature range. In some embodiments, the TCS of the first layer may be positive across a range of at least 200 C; in some embodiments, at least 100 C; and, in other embodiments, at least 50 C. As noted above, the second layer may have a different stiffness-temperature dependence than the first layer. The second layer may be a support layer that provides robustness to the first layer. The second layer may be formed of a material having a lower acoustical loss than the material of the first layer. In some embodiments, the second layer is formed of a material having a certain crystal structure. For example, the second layer may be formed of a single crystal material and/or a material having higher crystal quality than the material of the first layer (e.g., lower defects). In particular, when the first layer comprises $SiO_2$, the robustness and support provided by the second layer is useful, since a structure comprised of a thin $SiO_2$ layer(s) and the active layer can be fragile and prone to damage if subjected to forceful mechanical movements or vibrations. The second layer can also provide improved signal performance (e.g., less noise and better Q-factor). Suitable materials for the second layer can include silicon, diamond, silicon carbide, sapphire, quartz, germanium, aluminum nitride, and gallium arsenide, amongst others. In some embodiments, it is preferable for the second layer to be formed of silicon. The number of electrodes and placement of electrodes can be important as they can determine the types of acoustic waves and excitation modes generated by the mechanical resonating structure's motion. Examples of suitable electrode materials include, but are not limited to, aluminum (Al), molybdenum (Mo), titanium (Ti), chromium (Cr), ruthenium (Ru), gold (Au), platinum (Pt) or AlSiCu. In general, any suitable electrode material can be utilized for the electrode layer. In some embodiments, a thin layer of Ti and/or AN may be added beneath the electrode to enhance crystal orientation of the active (e.g., piezoelectric) material layer. In another embodiment, the compensating structure includes a third layer. In some cases, the third layer may be formed of a material having a positive TCS. Suitable materials having a positive TCS were described above in connection with the first layer. In some embodiments, the third layer comprises the same material as the first layer. However, in other embodiments, the third layer may comprise a different material than the first layer (and the second layer). In some embodiments, the first and third layers are formed of $SiO_2$ layers. In some of these cases, the second layer is formed of Si. As shown, the second layer is positioned between the first layer and the third layer. Other arrangements are possible. In some embodiments, the third layer has a similar thickness as the first layer. For example, the ratio of the thickness of the third layer to the thickness of the first layer may be between 1:0.25 and 1:4.0, between 1:0.75 and 1:1.25, or about 1:1. For example, the listed ratios may be suitable when the third layer is formed of the same composition as the first layer (e.g., when the first and third layers are both formed of $SiO_2$, or any other suitable material (e.g., any other suitable positive TCS material)). The mechanical resonating structure can vibrate in response to a source of excitation (e.g., application of an electrical potential), and in some embodiments is configured (shaped, sized, etc.) to support one or more modes of Lamb waves. The resonating structure may have a "large dimension" (i.e., the largest of the length, width, thickness, etc.) of less than 1 mm; in some cases, the large dimension is less than 500micron, or less than 100 micron, or less than 10 micron.

The piezoelectric thin film 330 can be made from, for example, aluminum nitride, zinc oxide, lead zicronate titanate (PZT), Lithium niobate (LiNbO3), Potassium niobate (KNbO3), Lithium tantanate (LiTaO3), Quartz, BST (Ba Sr TiO3, Barium strontium titanate) or MNT (Mn Nb TiO3 and/or Manganese niobium tianate). The piezoelectric thin film 330 is also deposited on top of a conductive layer 322. In some embodiments the surface of layer 324, portions of layer 324 and/or the entire layer 324 can be conductive and can be used instead of conductive layer 322. In other words, when the surface of layer 324, portions of layer 324 and/or the entire layer 324 is conductive, the conductive layer 322 is optional and may not included.

The plate structure 106 can be suspended mechanically from the substrate 328, for example, by using a cavity below the device 320, performing a backside etch, using a sacrificial layer or using a front-side under-etch of the entire plate 324.

By applying a voltage between the respective electrodes 310 and 312 and the bottom electrode 308, the piezoelectric layer 330 contracts or expands based on the inverse piezoelectric effect.

In the displayed embodiment in FIG. 4a, the bottom electrode 308 can be connected to ground. By applying a positive voltage and a negative voltage to the top electrode 310 and 312 via the pad 304 and 306, respectively, the piezoelectric layer 330 contracts and expands, and the underlying layer 324 clamped to the piezoelectric layer 330 contracts and expands at substantially the same time. If a negative voltage and a positive voltage are applied, the piezoelectric layer 330 expands and contracts, and causes the underlying layer to expand and contract. The resulting motion therefore resembles the motion described in FIGS. 3a and 3b.

Figure 5:
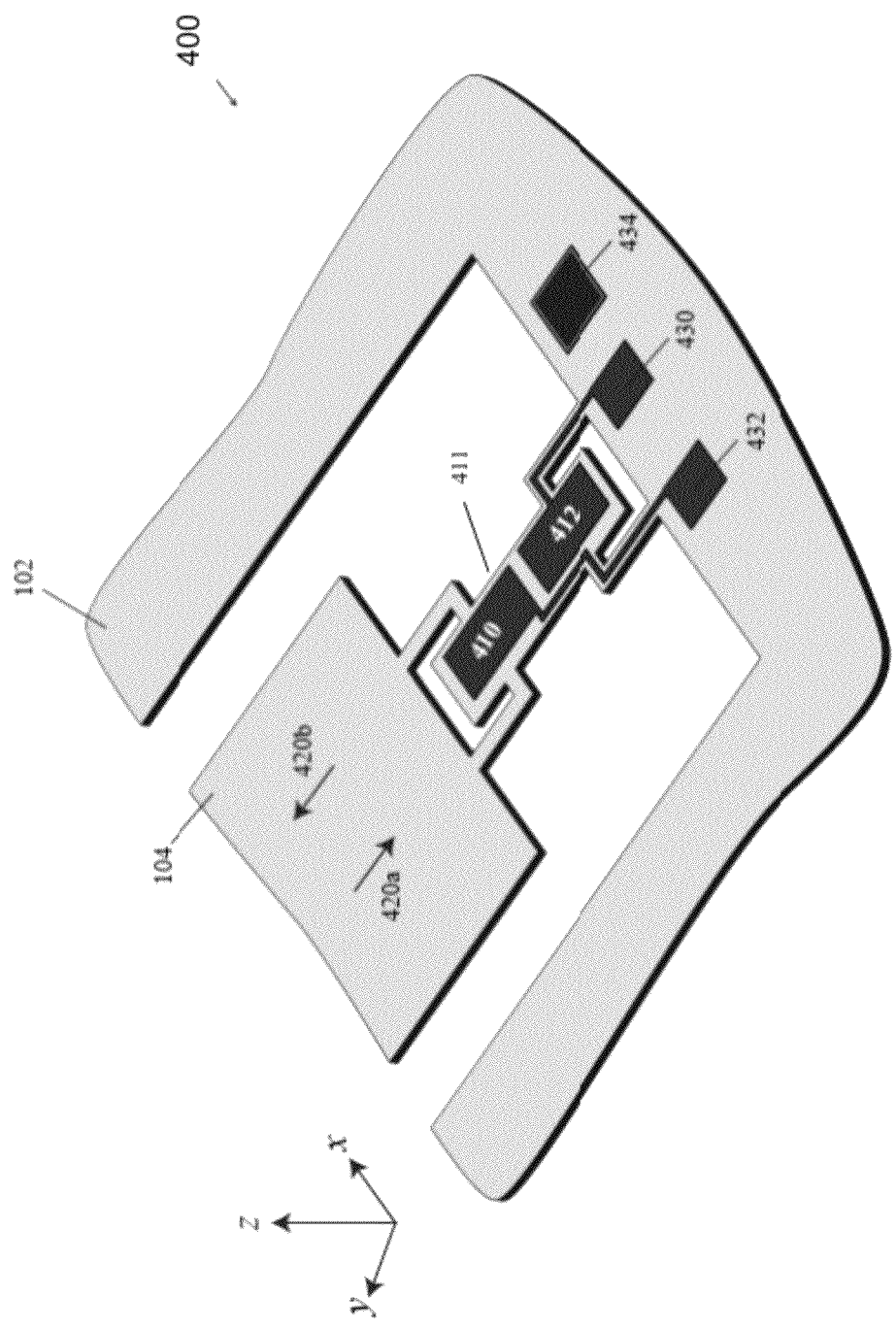
FIG. 5 shows a top perspective view of a resonant structure, according to another embodiment.

FIG. 5 shows a top perspective view of a resonant structure, according to another embodiment. Similar to the sensing technique using the two modes discussed above in connection with FIGS. 2a, 2b, 3a and 3b, FIG. 5 is discussed herein in connection with a resonant sensing technique using two modes. The plate 411 is driven in its second extensional mode by applying plus and minus voltages on electrodes 410 and 412, respectively. The y-axis motion of the proof mass 104, due to an external force or acceleration in the y-direction, represented by arrows 420a and 420b is transmitted to acoustic vibration plate 411. Examples of y-axis acceleration can include forces acting on the proof mass 104 along the y-direction as in accelerometers and Coriolis acceleration as in gyroscopes. The expansion and contraction of the plate 411 due to the motion of the proof mass 104 modulates the frequency of the extensional mode of the plate 411. The resulting change in the frequency of the plate 411 is proportional to the acceleration in the y-direction. This acceleration is also proportional to the rotation rate in gyroscopes, acceleration in accelerometers and forces in force sensors. The frequency change is measured using the electrodes 410 and 412. Electrode 434 is grounded as shown in FIG. 5.

Figure 6:
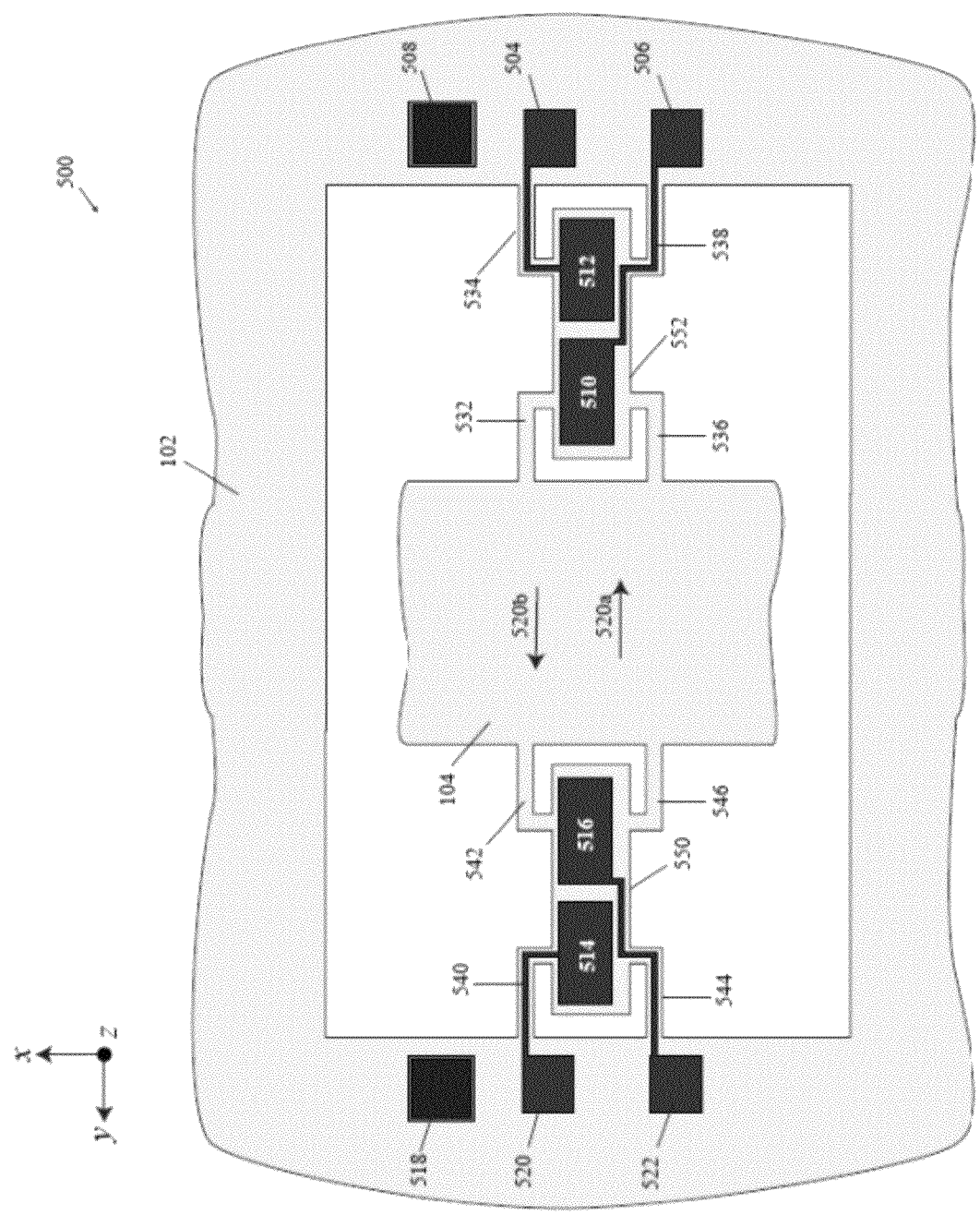
FIG. 6 shows a top view of a resonant structure, according to yet another embodiment.

In other embodiments, the resonant sensing can be done differentially. FIG. 6 shows a resonant structure 500 having two plates 550 and 552 anchored to the proof mass 104 using anchors 532, 536, 542 and 546. The plates are also anchored to the substrate by anchors 534, 538, 540 and 544. These two plates 550 and 552 are actuated in their second extensional modes and anchored rigidly at their nodal points. The y-axis motion of the proof mass 104 represented by arrows 520a and 520b is transmitted to acoustic vibration plates 550 and 552. The expansion and contraction of the plates due to the motion of the proof mass 104 modulates the frequency of the extensional mode of the plates 550 and 552. The two plates 550 and 552 placed on either side of the proof mass 104 experience a substantially equal and opposite axial force. The output of resonant structure 500 is the frequency shift difference between the two plate sensors 550 and 552, i.e., two plates 550 and 552 provide a differential output and their frequency shift is proportional to the acceleration. The frequency of the plates 550 and 552 is measured using the electrodes 504, 506, 520 and 522. Electrode 508 and 518 are grounded as shown in FIG. 6.

Figure 7:
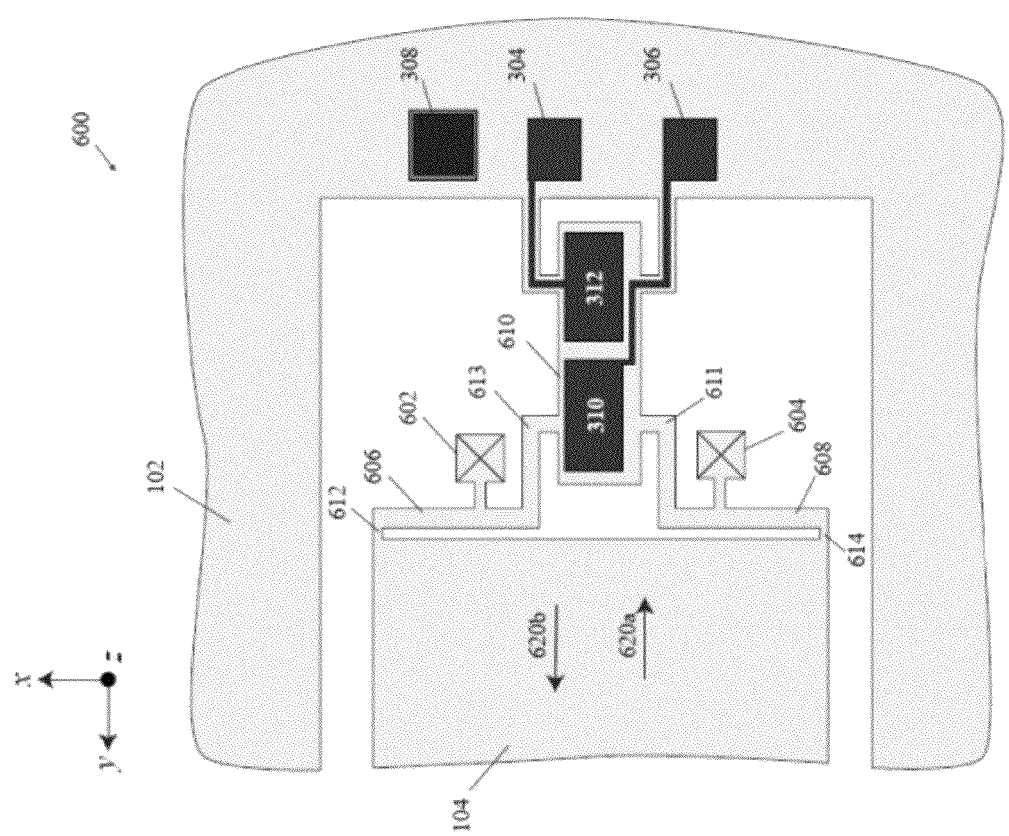
FIG. 7 shows a top view of a resonant structure, according to yet another embodiment.

FIG. 7 shows a top view of a resonant structure 600, according to yet another embodiment. The resonant structure 600 includes sensing plate 610 that can be connected to lever arms 606 and 608. The lever arms are anchored at the pivot points 602 and 604. The lever arms are connected at 612 and 614 to the proof mass 104. The proof mass 104 vibrates due to a force in y-direction. This force is amplified by the lever mechanism and is transmitted to the plate 610. The expansion and contraction of the plate 610 due to the amplified force modulates the frequency of the extensional mode of the plate 610. The resulting change in the frequency of the plate 610 is proportional to the acceleration and is measured using the electrodes 304 and 306. Electrode 308 is grounded as shown in FIG. 7.

Figure 8:
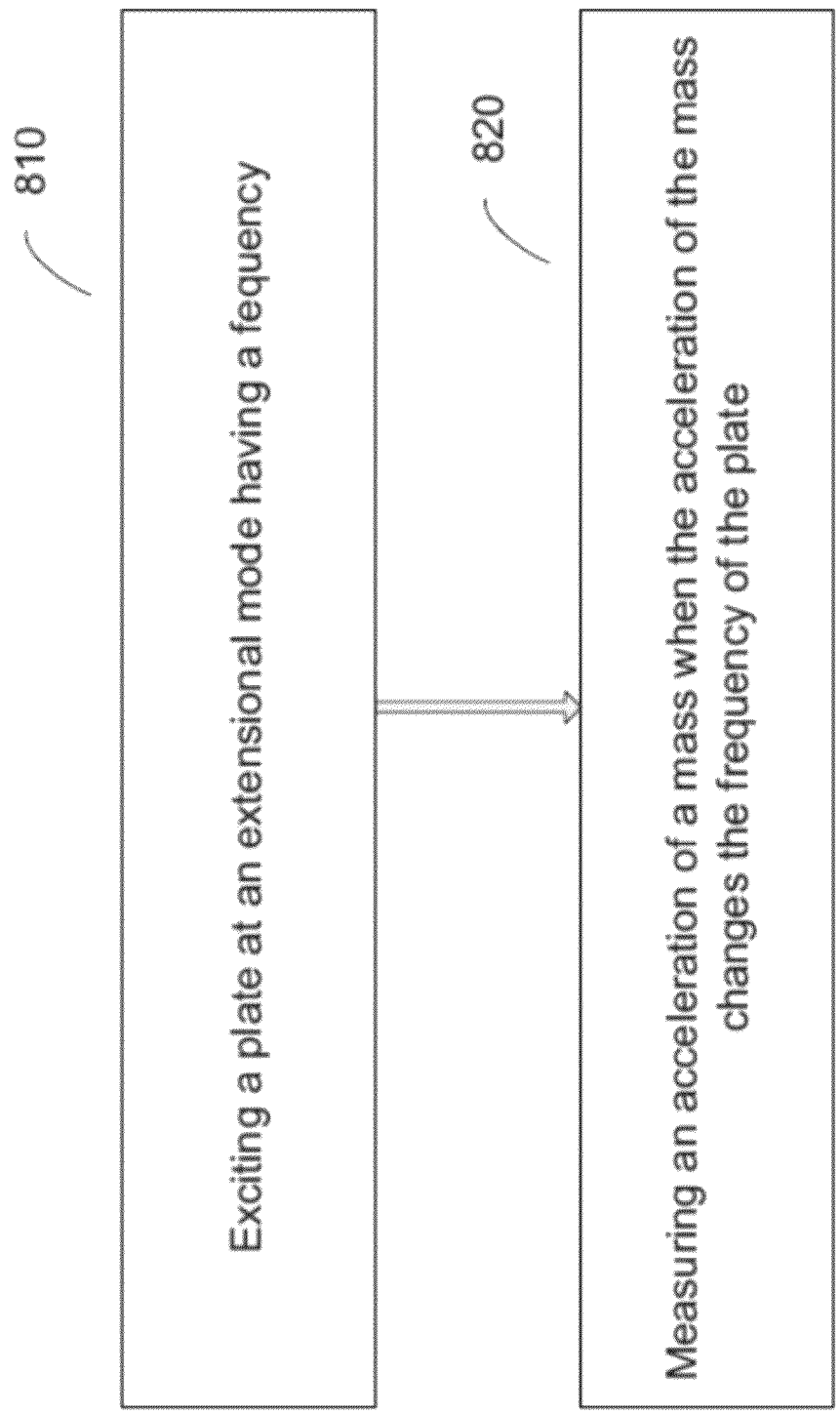
FIG. 8 shows a flow chart of a method for measuring acceleration, according to an embodiment.

FIG. 8 shows a flow chart of a method for measuring acceleration, according to an embodiment. As shown in FIG. 8, a plate of a resonant structure can be excited at an extensional mode having a frequency, at 810. The resonant structure can correspond to any of the embodiments described above and the plate can be excited in any appropriate manner as described above, for example, in connection with FIGS. 1-7. The resonant structure can include a set of electrodes that excite the plate.

An acceleration of a mass of the resonant structure is measured when the acceleration of the mass changes the frequency of the plate, at 820. The set of electrodes can measure the acceleration of the mass. For example, the set of electrodes can measure a frequency of the plate when the plate is excited. The difference between the frequency of the plate when excited and the frequency of the plate when the mass is moved can be related to the acceleration of the mass. For example, the difference between the frequency of the plate when excited and the frequency of the plate when the mass is moved can be proportional to the acceleration of the mass. For another example, the resonant structure can include multiple plates and the measurement can be performed differentially. See for example the discuss above regarding FIG. 6.

Upon reviewing the aforementioned embodiments, it would be evident to an artisan with ordinary skill in the art that the above embodiments can be modified, reduced, or enhanced without departing from the scope and spirit of the claims described below. For example, it would be apparent to those of ordinary skill in the art that the embodiments disclosed herein can be utilized for accelerometer applications, gyroscope applications, force sensing applications, and mass sensing applications, among other applications. It would be further apparent to those of ordinary skill in the art that the embodiments described herein can be utilized in computing devices such as computers and touch-screen computing devices such as tablets, portable communication devices such as cellular phones and smart phones, gaming devices that make use of motion sensing devices, or other electronic devices.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. One or more of the method steps described herein can be removed, performed in another sequence, and/or performed individually or simultaneously. Other method steps can also be added to the techniques described herein. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus, comprising:
    a resonant structure comprising:
        a mass;
        a plate coupled to the mass, wherein the plate has a size, shape and material to support one or more lamb waves of an extensional mode at a frequency when excited; and
        a plurality of electrodes coupled to the plate for delivering an excitation signal to the plate and for obtaining a measurement signal resulting from an acceleration of the mass which causes a modulation of the frequency of the extensional mode of the plate,
        wherein the plate includes a piezoelectric layer disposed on a temperature compensated layer,
        wherein the temperature compensated layer has first and third layers that have a stiffness that increases with increasing temperature over a temperature range with a second layer between the first and third layers, and
        wherein the second layer is formed from a different material than the first and third layers.

2. The apparatus of claim 1, wherein:
    the frequency is a first frequency,
    the plate has the extensional mode at the first frequency when excited along a first axis,
    the plate has a second frequency when the mass is moved along a second axis by an external force,
    the measurement signal obtained from the plurality of electrodes corresponds to a measure of a difference between the first frequency and the second frequency, the difference being proportional to the acceleration of the mass.

3. The apparatus of claim 1, wherein the extensional mode of the plate is at least one of a plurality of extensional modes.

4. The apparatus of claim 1, wherein:
    the extensional mode of the plate is at least one of a first extensional mode or a higher order extensional mode, and
    the plate has the extensional mode when excited by a piezoelectric effect.

5. The apparatus of claim 1, wherein the plate comprises a piezoelectric layer disposed on a temperature compensated layer, and wherein the piezoelectric layer comprises at least one of aluminum nitride, zinc oxide lead zirconate titanate (PZT), Lithium niobate (LiNbO3), Potassium niobate (KNbO3), Lithium tantanate (LiTaO3), Quartz, Barium strontium titanate (BaSrTiO3), or Manganese niobium titanate (MnNbTiO3).

6. The apparatus of claim 1, wherein the plate is made of at least one of silicon or silicon oxide.

7. The apparatus of claim 5, wherein the plate comprises a substrate and an electrode, and wherein the piezoelectric layer is disposed between the substrate and the electrode.

8. The apparatus of claim 5, wherein the plate comprises a substrate and an electrode, and wherein the electrode is disposed between the substrate and the piezoelectric layer.

9. The apparatus of claim 5, wherein the plate comprises a substrate and an electrode, and wherein the electrode is formed above or below the piezoelectric layer to actuate extensional modes of the plate.

10. The apparatus of claim 1, wherein the acceleration of the mass is associated with at least one of a Coriolis acceleration in a gyroscope, a force in a force sensor or an acceleration in an accelerometer.

11. The apparatus of claim 1, wherein the mass is connected to the plate by a plurality of anchors.

12. The apparatus of claim 1, wherein the mass is a first mass, wherein the apparatus comprises a plurality of masses including the first mass, and wherein at least a portion of the plurality of masses are connected to the plate.

13. The apparatus of claim 1, wherein the resonant structure comprises one of a substrate disposed about the plate and the mass on at least one side, the plate being connected to the mass, the plate being connected to the substrate, or the mass being connected to the substrate.

14. The apparatus of claim 1, wherein the resonant structure comprises one of the plate being mechanically suspended from a substrate by at least one anchor, the mass being connected to the plate, or the mass being connected to the substrate by at least one anchor.

15. The apparatus of claim 1, wherein at least the mass is connected to at least one lever arm.

16. The apparatus of claim 1, wherein the plate has the extensional mode when excited differentially.

17. The apparatus of claim 16, wherein a first electrode of the plurality of electrodes excites the extensional mode of the plate, and wherein at least a second electrode of the plurality of electrodes is used to differentially sense the extensional mode of the plate.

18. The apparatus of claim 1, wherein the plate is a first plate, wherein the resonant structure comprises a second plate, wherein the first plate and the mass are connected, and wherein the second plate and the mass are connected.

19. The apparatus of claim 1, wherein:
    the plate is a first plate,
    the frequency is a first frequency,
    the resonant structure comprises a second plate having an extensional mode at a second frequency when excited,
    the first plate and the mass are connected, the second plate and the mass being connected, the measurement signal obtained from the plurality of electrodes provide a measure of the acceleration of the mass when the acceleration of the mass changes the first frequency of the first plate and the second frequency of the second plate, the acceleration of the mass being proportion to a difference between the first frequency of the first plate when changed and the second frequency of the second plate when changed.

20. The apparatus of claim 1, wherein the resonant structure comprises a substrate, and wherein the plate is connected to the substrate and the mass by at least one anchor.

21. The apparatus of claim 1, wherein the resonant structure comprises a substrate, and wherein the plate is connected to the substrate by at least one anchor.

22. The apparatus of claim 1, wherein the mass is connected to a substrate by at least one anchor.

23. An apparatus, comprising:
a plate having first and second opposite surfaces, wherein the first surface has a piezoelectric layer without the second surface having the piezoelectric layer; and
a mass attached to the plate,
wherein the plate has a size, shape and material to support one or more lamb waves of an extensional mode at a first frequency when excited along an axis, wherein the plate has a second frequency when the mass is moved along the axis by an external force, and wherein a difference between the first frequency and the second frequency is associated with an acceleration of the mass when moved,
wherein the plate includes a temperature compensated layer,
wherein the piezoelectric layer is disposed on the temperature compensated layer,
wherein the temperature compensated layer has first and third layers that have a stiffness that increases with increasing temperature over a temperature range with a second layer between the first and third layers, and
wherein the second layer is formed from a different material than the first and third layers.

24. The apparatus of claim 23, wherein the apparatus is integrated in a portable communication device.

25. The apparatus of claim 24, wherein the portable communication device is a cellular phone.

* * * * *